United States Patent [19]
Keller et al.

[11] 3,769,554
[45] Oct. 30, 1973

[54] APPARATUS FOR VARYING THE STRENGTH OF A STABILIZED MAGNETIC FIELD

[75] Inventors: Toni W. Keller, Fallanden; Werner H. Tschopp, Forch, both of Switzerland

[73] Assignee: Spectrospin A.G., Zurich-Fallanden, Switzerland

[22] Filed: June 2, 1972

[21] Appl. No.: 259,211

[30] Foreign Application Priority Data
Sept. 15, 1971 Germany.................. P 21 46 033.3

[52] U.S. Cl. ............................................... 317/123
[51] Int. Cl. .............................................. G05f 7/00
[58] Field of Search .................................... 317/123

[56] References Cited
UNITED STATES PATENTS

| | | | |
|---|---|---|---|
| 3,080,507 | 3/1963 | Wickerham et al. ............... | 317/123 |
| 3,174,098 | 3/1965 | Shapiro ............................... | 317/123 |
| 3,237,055 | 2/1966 | Riordan ............................... | 317/123 |
| 3,673,465 | 6/1972 | Tschopp ............................. | 317/123 |

*Primary Examiner*—L. T. Hix
*Attorney*—Dean S. Edmonds et al.

[57] ABSTRACT

Apparatus is described for varying the strength of a stabilized magnetic field by connecting to an integrating amplifier in a field-stabilizing feedback loop a pulse generator that produces current pulses of selectable polarity. The amplifier may be an operational amplifier. For improved signal-to-noise ratios, the output of the pulse generator may be applied to the amplifier through a pair of parallel-connected, oppositely-poled diodes having a threshold voltage high enough to eliminate noise signals.

6 Claims, 3 Drawing Figures

PATENTED OCT 30 1973                          3,769,554

APPARATUS FOR VARYING THE STRENGTH OF A STABILIZED MAGNETIC FIELD

BACKGROUND OF THE INVENTION

In a conventional spin resonance spectrometer, a sample to be studied is located in a stabilized main magnetic field and subjected to a rotating RF field having a magnetic component that is perpendicular to that of the stabilized magnetic field. A spin resonance spectrum may be recorded by varying either the strength of the stabilized magnetic field or the frequency of the rotating magnetic field.

The main magnetic field is stabilized by a feedback path from a sensing coil to a field excitation coil. Changes in the magnetic field induce a current in the sensing coil that is integrated in an integrating operational amplifier, for example, to produce an output signal proportional to the magnitude of the change in the magnetic field strength. This output signal is applied to a regulating element that controls the current in the excitation coil and works against a change in the field strength. This feedback system does not respond to the absolute value of the magnetic field, but only to changes in it.

In certain apparatus for sweeping through a spin resonance spectrum, the strength of the main magnetic field is varied by an AC voltage source connected to the input of the integrating operational amplifier in the feedback path. As a result of this arrangement, the feedback loop responds as if the magnetic field were changing and it alters the magnetic field so that the current supplied by the sensing coil compensates the current supplied by the AC voltage source. As a result, the spin resonance spectrum is swept out by varying the magnetic field without affecting its stability.

This apparatus, however, has several disadvantages. The AC voltage source is connected to the operational amplifier through a capacitor. Because the displacement current flowing through the capacitor is proportional to the change in the applied voltage, the displacement current into the operational amplifier is constant for a linearly rising or falling voltage and therefore produces a constant change in the magnetic field. However, because of losses inherent in the capacitor, an additional current proportional to the voltage across the capacitor is superimposed on the constant displacement current. This added current produces an undersirable and undefinable drift in the strength of the main magnetic field and impairs the desired accuracy of any spin resonance measurements. Moreover, because the desired variations in the magnetic field are quite small, the signal that is applied from the AC voltage source is very weak and therefore very easily disturbed by noise.

SUMMARY OF THE INVENTION

In accordance with the present invention, these problems are avoided in sweeping out a spectrum by varying the stabilized magnetic field with a pulse generator that supplies current pulses of selectable polarity to an operational amplifier in the feedback circuit. Such a pulse generator may be connected directly to the input of the operational amplifier so as to avoid all the problems created by using a capacitor in the input. In addition, disturbances due to noise may be minimized by using short-duration, high-amplitude pulses having a high signal-to-noise ratio. Because the current pulses supplied in accordance with the invention vary the magnetic field strength in discrete steps, there are time intervals between pulses when the magnetic field has a constant strength. These intervals may be used for conducting measurements. This is particularly useful when the individual measurements are stored in digital computers because the clock generator of the computer can be used to control both the pulse generator and the measurement process.

In a preferred embodiment of the invention, the pulse generator supplies current pulses having the same energy content and a variable pulse repetition rate. For example, the energy content of the current pulses may be selected so that each pulse effects a change of one microgauss in the magnetic field. Accordingly, the increase in magnetic field strength is determined simply by the number of applied current pulses of like polarity, and the rate of increase is determined by the pulse repetition rate. Advantageously, the amplitude of the main field change and the rate of change should be independently controllable. The direction of field change can be determined in accordance with the invention simply by selecting the polarity of the current pulses. The changeover from increasing to decreasing magnetic field strength may be determined and controlled by using a counting device to reverse the polarity of the current pulses after each sequence of a predetermined number of pulses.

To improve the signal-to-noise ratio, the pulse generator may advantageously be connected to the input of the operational amplifier through at least one pair of oppositely poled diodes connected in parallel. These diodes are selected to have a threshold voltage greater than the noise signal generated by the pulse generator. As a result, the pulse generator is effectively disconnected from the operational amplifier during intervals between pulses, and is only connected for the duration of each current pulse.

BRIEF DESCRIPTION OF THE DRAWING

The present invention will be described in detail in conjunction with the accompanying drawing, in which.

DETAILED DESCRIPTION OF THE INVENTION

Figure 1:
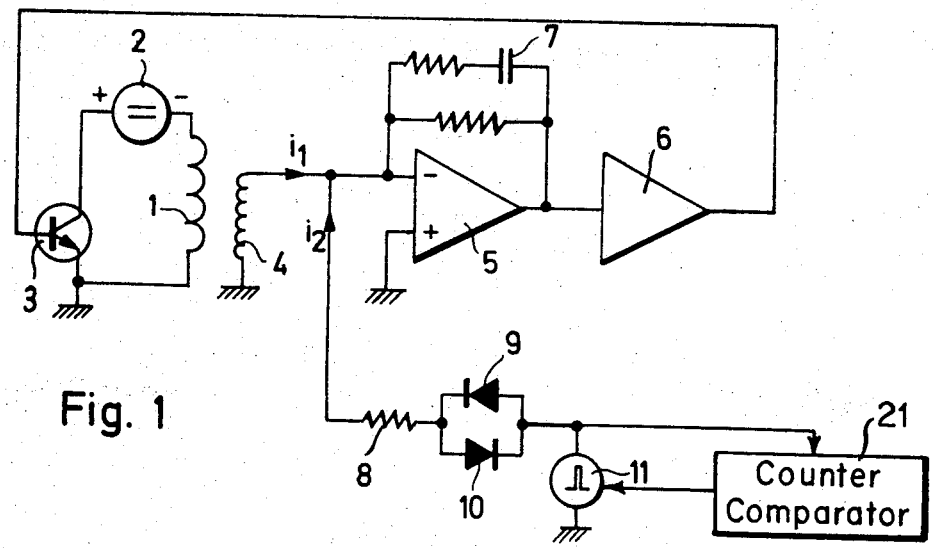
FIG. 1 is a schematic diagram of an illustrative embodiment of the invention.

The circuit of FIG. 1 is used to control the intensity of the main magnetic field in apparatus such as a nuclear magnetic resonance (NMR) spectrometer. On the left-hand side of the circuit is an excitation coil 1 supplied by current from a DC current source 2 to generate a magnetic field. A regulating element 3, shown in simplified form as a transistor, controls the current amplitude in excitation coil 1. Regulating element 3 receives a control signal from a device comprising a sensing coil 4, an integrating operational amplifier 5 and, if necessary, a second amplifier 6. A capacitor 7 in the feedback path of operational amplifier 5 causes it to act as an integrator.

Whenever there is a change in the magnetic field generated by excitation coil 1, a current $i_1$ is induced in sensing coil 4 and applied to the input of operational amplifier 5. Operational amplifier 5 integrates current $i_1$, producing an output signal proportional to the magnitude of the net change in the magnetic field. This output signal is amplified in amplifier 6 and applied to regulating element 3 to change the current in excitation coil 1 so as to work against any change in the main magnetic field, thus keeping the main magnetic field substantially constant.

The circuit of FIG. 1 also includes apparatus for varying the main magnetic field in a predetermined manner without affecting its stability. Pulse generator 11 produces current pulses having constant duration and amplitude at a variable pulse repetition rate and polarity. Two parallel-connected, oppositely poled diodes 9 and 10 (sometimes called crossed diodes) are connected in series with a resistor 8 between the output of the pulse generator and the input to operational amplifier 5.

Pulse generator 11 supplies current pulses $i_2$ to operational amplifier 5, where they are integrated and applied to regulating element 3 via amplifier 6. As a result, the current amplitude in excitation coil 1 is varied such as to induce a current $i_1$ in sensing coil 4 equal and opposite to current $i_2$. In this way, for every current pulse, the magnetic field induced by excitation coil 1 is changed by an amount proportional to the time integral of current $i_1$. Because current $i_1$ induced in sensing coil 4 has a sign opposite to that of the applied current $i_2$, positive current pulses produce a reduction in the main magnetic field strength and negative current pulses produce an increase.

Figure 2A:
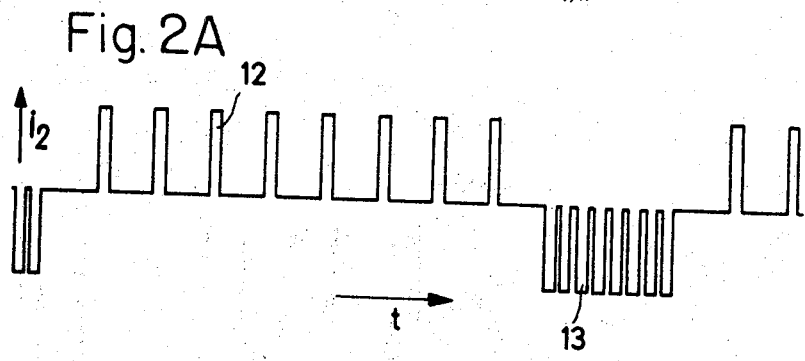
FIGS. 2A and 2B are diagrams explaining the method of operating the embodiment shown in FIG. 1.
Figure 2B:
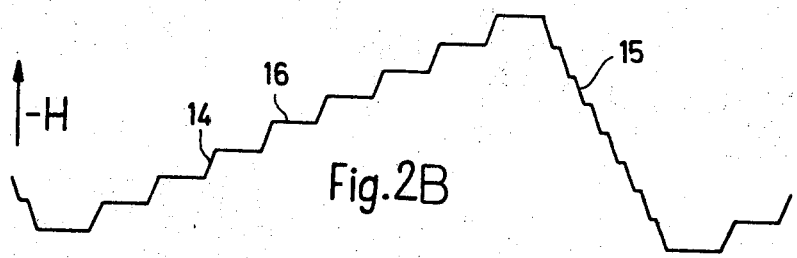

FIG. 2A illustrates a sequence of current pulses from pulse generator 11, and FIG. 2B illustrates the effects of these pulses on the magnetic field strength. The pulses of FIG. 2A have equal amplitude and equal duration but different repetition rates and polarities. Each positive current pulse 12 and each negative current pulse 13 causes the same magnitude change 14, 15, respectively, in the magnetic field. Note that the ordinate of FIG. 2B is −H. It is evident that after equal numbers of positive pulses 12 and negative pulses 13 the strength of the magnetic field H returns to its initial value. It is also evident that a change in the pulse repetition rate changes the rate of change of the magnetic field strength but does not affect the total change in the magnetic field, determined by the number of pulses and their polarity. Thus, any desired change in magnetic field strength can be controlled solely by the number of pulses and their polarity, and different rates of change may independently be achieved by varying the pulse repetition rate.

Pulse generator 11 may be controlled by any number of techniques known in the art. For example, a counter-comparator 21 can be used that counts the pulses, compares the count with some preselected number, and reverses the pulse polarity after counting the preselected number of pulses. This reversal in polarity may be effected after a preselected time delay and, if desired, it may be combined with a change in the pulse repetition frequency such as is illustrated in FIG. 2B.

Because the magnetic field strength is constant between successive current pulses (and hence successive changes in the magnetic field strength), periods 16 of constant magnetic field strength may be used for performing measurements in the magnetic field. If the measurements are evaluated by means of a digital computer, it is useful to synchronize pulse generator 11 to the operation sequence of the computer. This may be done by controlling pulse generator 11 with synchronizing pulses derived from the computer clock generator.

As will be apparent to those skilled in the art, numerous other modifications may be made to the preferred embodiment described and illustrated herein without departing from the scope of the invention as defined in the claims.

What is claimed is:

1. In apparatus for varying the strength of a magnetic field stabilized by a feedback system including a field excitation coil, a sensing coil inductively coupled to the field excitation coil, an integrator connected thereto and a regulating element responsive to the integrator output for controlling the current amplitude in the field excitation coil to stabilize the magnetic field, the improvement comprising a pulse generator for supplying to the input of the integrator pulses having constant energy content, variable sign, and variable repetition rate for changing the strength of the magnetic field in steps proportional to the time integral of said pulses.

2. Apparatus as defined in claim 1 including a pair of parallel-connected, oppositely-poled diodes connected between the pulse generator and the integrator for substantially blocking current due to noise from affecting the strength of the magnetic field.

3. Apparatus as defined in claim 1 wherein said control means includes a counter for counting the pulses produced by the pulse generator to reverse the polarity of said pulses after each sequence of a predetermined number of pulses.

4. Apparatus as defined in claim 1 including a pair of parallel-connected, oppositely-poled diodes connected between the pulse generator and the integrator for substantially blocking current due noise from affecting the strength of the magnetic field.

5. Apparatus as defined in claim 1 wherein the connection between the pulse generator and the integrator is ohmic.

6. In a method of controllably varying the strength of a magnetic field stabilized by a feedback system including a field excitation coil, a sensing coil inductively coupled to the excitation coil, an integrator connected thereto and a regulating element responsive to the integrator output for controlling the current amplitude in the field excitation coil to stabilize the magnetic field, the improvement comprising supplying to the input of the integrator current pulses having constant energy content, variable sign, and variable repetition rate for varying the strength of the stabilized magnetic field in accordance with the time integral of the current in each such current pulse.

\* \* \* \* \*

UNITED STATES PATENT OFFICE
CERTIFICATE OF CORRECTION

Patent No. 3,769,554      Dated October 30, 1973

Inventor(s) Toni W. Keller and Werner H. Tschoff

It is certified that error appears in the above-identified patent and that said Letters Patent are hereby corrected as shown below:

Column 3, line 23, "current $i_1$" first occurrence should read --current $i_2$--.

Signed and sealed this 16th day of April 1974.

(SEAL)
Attest:

EDWARD M. FLETCHER, JR.
Attesting Officer

C. MARSHALL DANN
Commissioner of Patents